United States Patent [19]
Fowler et al.

[11] Patent Number: 5,363,555
[45] Date of Patent: Nov. 15, 1994

[54] METHOD OF MANUFACTURING AN ARTICLE BY SUPERPLASTIC FORMING AND DIFFUSION BONDING

[75] Inventors: John O. Fowler; Brian Richardson, both of Lancashire, England

[73] Assignee: Rolls-Royce plc, Derby, United Kingdom

[21] Appl. No.: 45,097

[22] Filed: Apr. 12, 1993

[30] Foreign Application Priority Data

May 1, 1992 [GB] United Kingdom ............ 9209464.8

[51] Int. Cl.[5] .............................................. B23K 31/02
[52] U.S. Cl. .................................... 29/889.72; 228/157
[58] Field of Search ........................... 228/118, 157; 29/889.72, 890.42, 421.1; 72/299

[56] References Cited

U.S. PATENT DOCUMENTS

| | | | |
|---|---|---|---|
| 4,526,312 | 7/1985 | Goss et al. ............................ | 228/157 |
| 4,833,768 | 5/1989 | Ecklund et al. ..................... | 29/421.1 |
| 4,882,823 | 11/1989 | Weisert et al. ................... | 228/157 X |
| 5,063,662 | 11/1991 | Porter et al. ...................... | 29/889.72 |

FOREIGN PATENT DOCUMENTS

| | | | |
|---|---|---|---|
| 0448339 | 9/1991 | European Pat. Off. . | |
| 460872 | 12/1991 | European Pat. Off. ......... | 29/890.42 |
| 3121126 | 1/1983 | Germany . | |
| 1291927 | 10/1972 | United Kingdom . | |
| 1589499 | 5/1981 | United Kingdom . | |
| 2073631 | 10/1981 | United Kingdom ................ | 72/299 |
| 2095137 | 9/1982 | United Kingdom . | |
| 2155822 | 10/1985 | United Kingdom . | |

*Primary Examiner*—Kenneth J. Ramsey
*Attorney, Agent, or Firm*—Cushman, Darby & Cushman

[57] ABSTRACT

A plurality of titanium sheets are assembled into a stack. At least one of the sheets is provided with a stop off material on one of its surfaces to prevent diffusion bonding at predetermined positions. The edges of the sheets are welded together and a pipe is welded to the stack to interconnect with the stop off material to form a sealed assembly. The assembly is heated and externally pressurized to diffusion bond the sheets together. The integral structure so formed is heated and opposite ends of the integral structure are twisted relatively to contour the integral structure to a predetermined shape. The integral structure is internally pressurized to break the adhesive bonds. The integral structure is heated and internally pressurized to superplastically form one sheet to produce an article, e.g. a fan blade.

20 Claims, 2 Drawing Sheets

METHOD OF MANUFACTURING AN ARTICLE BY SUPERPLASTIC FORMING AND DIFFUSION BONDING

FIELD OF THE INVENTION

The present invention relates to a method of manufacturing an article by superplastic forming and diffusion bonding.

BACKGROUND OF THE INVENTION

It is known to manufacture hollow metallic articles by superplastic forming and diffusion bonding metal workpieces. These metal workpieces include elementary metal, metal alloys and metal matrix composites. At least one of the metal workpieces must be capable of superplastic extensions.

In one known process the surfaces of the workpieces to be joined are cleaned, and at least one surface of one or more of the workpieces is coated in preselected areas with a material to prevent diffusion bonding. The workpieces are arranged in a stack and the edges of the workpieces are welded together, except where a pipe is welded to the workpieces, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is then evacuated, using the pipe, and the pipe is sealed. The sealed assembly is placed in a pressure vessel and is heated and pressed to diffusion bond the workpieces together to form an integral structure. Diffusion bonding occurs when two mating surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the workpieces to be superplastically formed to produce an article matching the shape of the dies.

SUMMARY OF THE INVENTION

The present invention seeks to provide a novel method of manufacturing a contoured article by superplastic forming and diffusion bonding.

Accordingly the present invention provides a method of manufacturing an article by superplastic forming and diffusion bonding at least two metal workpieces comprising the steps of (a) applying a stop off material to prevent diffusion bonding to preselected areas of at least one of the surfaces of at least one of the at least two metal workpieces, (b) assembling the at least two workpieces into a stack relative to each other so that the surfaces are in mating abutment, (c) applying heat and pressure across the thickness of the at least two workpieces to diffusion bond the at least two workpieces together in areas other than the preselected areas to form an integral structure, (d) heating the integral structure and applying loads to opposite ends of the integral structure to twist one end relative to the other end to contour the integral structure to a predetermined shape, (e) internally pressurising the integral structure to break the adhesive bond between the stop off material and the at least one workpiece in the preselected areas, (f) heating the integral structure and internally pressurising it to cause the preselected areas of at least one of the workpieces to be superplastically formed to produce an article of predetermined shape.

Preferably after internally pressurising the integral structure to break the adhesive bond and before internally pressurising the integral structure to superplastically form at least one workpiece the interior of the integral structure is sequentially evacuated and supplied with inert gas to remove oxygen from the interior of the integral structure.

Preferably the step of sequentially evacuating and supplying inert gas to the interior of the integral structure to remove oxygen is performed a plurality of times.

The present invention also provides a method of manufacturing an article by superplastic forming and diffusion bonding at least two metal workpieces, each of the metal workpieces having at least one flat surface, the method comprising the steps of (a) applying a stop off material to prevent diffusion bonding to preselected areas of at least one of the flat surfaces of at least one of the at least two metal workpieces, (b) assembling the at least two workpieces into a stack relative to each other so that the flat surfaces are in mating abutment, (c) sealing the edges of the at least two workpieces together, except where a pipe is to be inserted, and joining a pipe to the stack to provide a sealed assembly, (d) sequentially evacuating the interior of the sealed assembly and supplying inert gas to the interior of the sealed assembly through the pipe to remove oxygen from the interior of the sealed assembly, (e) placing the sealed assembly in an oven while continuously evacuating the sealed assembly, (f) heating the sealed assembly while it is within the oven to evaporate volatile binder from the stop off material while continuously evacuating the sealed assembly to remove the volatile binder from between the at least two metal workpieces of the sealed assembly, (g) sealing the pipe, (h) applying heat and pressure across the thickness of the at least two workpieces to diffusion bond the at least two workpieces together in areas other than the preselected areas to form an integral structure, (i) heating the integral structure and applying loads to opposite ends of the integral structure to twist one end relative to the other end to contour the integral structure to a predetermined shape, (j) internally pressurising the integral structure to break the adhesive bond between the stop off material and the at least one workpiece in the preselected areas, (k) heating the integral structure and internally pressurising it to cause the preselected areas of at least one of the workpieces to be superplastically formed to produce an article of predetermined shape.

Preferably, before the pipe is sealed, the sealed assembly is cooled whilst the sealed assembly is continuously evacuated.

Preferably after internally pressurising the integral structure to break the adhesive bond and before internally pressurising the integral structure to superplastically form at least one workpiece the interior of the integral structure is sequentially evacuated and supplied with inert gas to remove oxygen from the interior of the integral structure.

Preferably the step of sequentially evacuating and supplying inert gas to the interior of the integral structure to remove oxygen is performed a plurality of times.

Preferably the edges of the workpieces are welded together.

Preferably the step of sequentially evacuating the interior of the sealed assembly and supplying inert gas to the interior of the sealed assembly through the pipe to remove oxygen from the interior of the sealed assembly is performed a plurality of times.

Where the workpieces are made of a titanium alloy, the workpieces are heated to a temperature equal to or greater than 850° C. and the pressure applied is equal to or greater than $20 \times 10^5$ Nm$^{-2}$ to diffusion bond the workpieces together to form an integral structure.

Preferably the workpieces are heated to a temperature between 900° C. and 950° C. and the pressure applied is between $20 \times 10^5$ Nm$^{-2}$ and $30 \times 10^5$ Nm$^{-2}$.

The integral structure is heated to a temperature equal to or greater than 850° C. to superplastically form the integral structure.

Preferably the integral structure is heated to a temperature between 900° C. and 950° C.

Preferably the integral structure is heated to a temperature of 800° C. for twisting the opposite ends of the integral structure.

Preferably before the opposite ends of the integral structure are twisted the integral structure is heated and a load is applied to one end of the integral structure to camber said end.

BRIEF DESCRIPTION OF THE DRAWINGS

The present invention will be more fully described by way of example with reference to the accompanying drawings, in which.

DETAILED DESCRIPTION OF THE INVENTION

Figure 1:
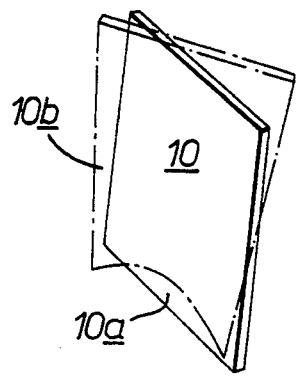
FIG. 1 is a diagrammatic view of an integral structure formed by diffusion bonding a stack of workpieces before and after twisting according to the present invention.
Figure 2:
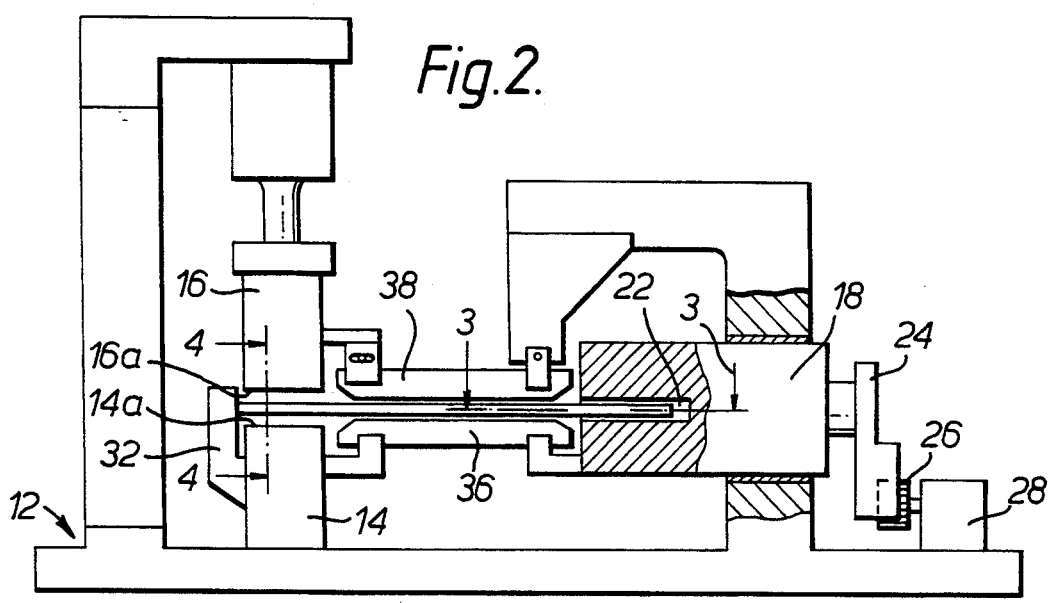
FIG. 2 is a part cross-sectional view of a machine tool used for twisting the integral structure according to the present invention.
Figure 3:
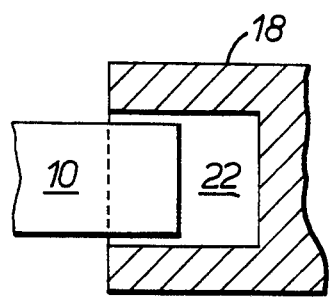
FIG. 3 is a view on line 3—3 of FIG. 2.
Figure 4:
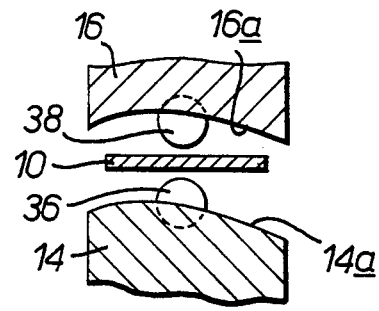
FIG. 4 is a view on line 4—4 of FIG. 2.
Figure 5:
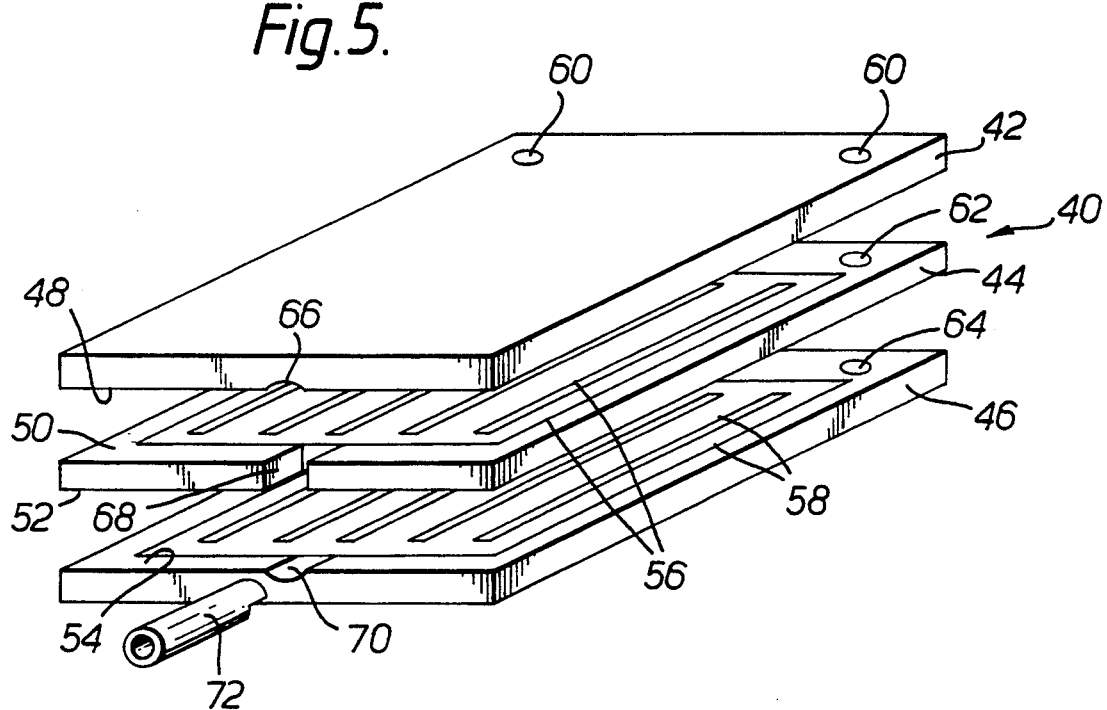
FIG. 5 illustrates an exploded view of a stack of workpieces which are superplastically formed and diffusion bonded to form an article according to the present invention.

In FIG. 5, three sheets of titanium alloy 42, 44 and 46 are assembled into a stack 40.

Prior to assembling the sheets 42, 44 and 46 into the stack 40, the mating surfaces 48, 50, 52 and 54 of the sheets 42, 44 and 46 are prepared for diffusion bonding by chemical cleaning. One of the mating surfaces 48 and 50 in this example, mating surface 50, has had a stop off material applied, and one of the mating surfaces 52 and 54, in this example mating surface 54, has had a stop off material applied. It is to be noted that the mating surfaces 48, 50, 52 and 54 of the sheets 42, 44 and 46 are substantially flat. The stop off may comprise powdered yttria in a binder and solvent e.g. the stop off known as "Stopyt 62A" which is sold by an American company named GTE Service Corporation of 100 Endicott Street, Danvers, Mass. 10923, U.S.A.

The stop off material is applied in desired patterns 56 and 58, shown as the shaded areas in FIG. 5, by the known silk screen printing process. The desired patterns 56 and 58 of stop off material prevent diffusion bonding between preselected areas of the sheets 42, 44 and 46. In this example the stop off is applied in straight lines, but it may be applied as dots or other suitable patterns depending on the particular article to be manufactured. The three sheets of titanium alloy 42, 44 and 46 are then assembled into the stack 40. The sheet 42 has a pair of dowel holes 60 which are axially aligned with corresponding dowel holes 62 in sheet 44 and with corresponding dowel holes 64 in sheet 46 to ensure the correct positional relationship between the three sheets 42, 44 and 46 in he stack 40. The sheets 42, 44 and 46 are maintained in this positional relationship by a pair of dowels (not shown) which are inserted in the axially aligned dowel holes 60, 62 and 64.

The sheets 42, 44 and 46 of the stack 40 are placed together to trap an end of a pipe 72. In this example a groove 66 is machined on surface 48 of sheet 42, a slot 68 is machined through sheet 44 and a groove 70 is machined on surface 54 of sheet 46. The slot 68 in sheet 44 extends between the surfaces 50 and 52 to interconnect the pattern of stop off between the sheets 42 and 44 with the pattern of stop off between sheets 44 and 46. The pipe 72 is positioned so as to project from between the three sheets 42, 44 and 46. One end of the pipe 72 interconnects with the pattern of stop off material between the sheets 42 and 44 and also with the pattern of stop off material between sheets 44 and 46. In this example grooves 66, 68 and 70 are machined in the sheets 42, 44 and 46. On completion of the assembly in the manner described it is welded about its periphery so as to weld the edges of sheets 42 and 44 together, and so as to weld the edges of sheets 44 and 46 together. The pipe 72 is also welded around its periphery to the sheets 42, 44 and 46. A sealed assembly is formed except for the inlet provided by the pipe 72.

It is of course possible to machine grooves on the mating surfaces of one pair of sheets to trap an end of a pipe, and to provide apertures, or slots, through one of these sheets to interconnect with the stop off patterns between all the sheets. As a further alternative it is possible to machine grooves on each set of mating surfaces of the sheets to trap the end of a respective pipe. In this variant a number of pipes are required. In the last two possibilities it is possible to machine the grooves in one, or both, of the mating surfaces.

The pipe 72 is then connected to a vacuum pump which is used to evacuate the interior of the sealed assembly and then inert gas, for example argon, is supplied to the interior of the sealed assembly. This process of evacuating and supplying inert gas to the interior of the sealed assembly may be repeated several times in order to ensure that most, or substantially all, traces of oxygen are removed from the interior of the sealed assembly. The particular number of times that the interior of the sealed assembly is evacuated and purged with inert gas depends upon the size of the workpieces and upon the required integrity of the finished component. The smaller the traces of oxygen remaining, the greater the quality of the the subsequent diffusion bond. The inert gas is supplied to pressurise the interior of the sealed assembly to atmospheric pressure.

The sealed assembly is evacuated and is placed into an oven. The sealed assembly is then heated to a temperature between 250° C. and 350° C. to evaporate the binder from the stop off material. During the baking out of the binder, the sealed assembly is continuously evacuated to remove the binder from between the sheets. After the binder has been removed, which is determined either by monitoring the binder levels in the gas extracted from the sealed assembly or by maintaining the sealed assembly at the temperature between 250° C. and 350° C. for a predetermined time, the sealed assembly is removed from the oven and is allowed to cool to ambient temperature whilst being continuously evacuated. The binder is baked out of the sealed assembly at a suitably low temperature to reduce, or prevent, oxidation of the exterior surface of the sealed assembly.

The pipe 72 is then sealed so that there is a vacuum in the sealed assembly. The sealed assembly is then transferred carefully to an autoclave because the stop off is brittle and easily damaged. Alternatively a predetermined amount of binder may be left in the stop off material, so that the stop off is not too brittle, to enable the sealed assembly to be transferred to the autoclave without damage to the stop off.

The temperature in the autoclave is increased such that the sealed assembly is heated to a temperature greater than 850° C. and the argon pressure in the autoclave is raised to greater than 20 atmospheres, 294 pounds per square inch ($20.26 \times 10^5 Nm^{-2}$) and held at that temperature and pressure for a predetermined time. Preferably the sealed assembly is heated to a temperature between 900° C. and 950° C. and the pressure is between 294 pounds per square inch ($20.26 \times 10^5 Nm^{-2}$) and 441 pounds per square inch ($30.39 \times 10^5 Nm^{-2}$). For example if the sealed assembly is heated to 925° C. and the pressure is raised to 300 lbs/sq.in the temperature and pressure are held constant for about 2 hours. The pressure is then reduced to ambient, diffusion bonding having been achieved and the sealed assembly, which is then an integral structure, is removed.

The mating surfaces 48, 50, 52 and 54 of the sheets 42, 44 and 46 are substantially flat, to ensure that good quality diffusion bonds are produced between the sheets. The argon supplied to pressurise the sealed assembly is an isostatic pressure and because the mating surfaces 48, 50, 52 and 54 are flat this ensures that the pressure at all points on the mating surfaces 48, 50, 52 and 54 is the same to give uniform high quality diffusion bonds at all points on these surfaces.

It is also possible to transfer the sealed assembly directly to the autoclave, immediately after the the pipe 72 is sealed without the requirement to cool the sealed assembly to ambient temperature, however some cooling of the sealed assembly may occur.

The integral structure 10 is then placed into a twisting machine, as shown in FIGS. 1 to 4, which is described more fully in our UK Patent No GB2073631B the contents of which are incorporated herein by reference. One end of the integral structure 10, an end which is subsequently to form the root portion of a blade, is located between a pair of relatively movable dies 14, 16. The opposite end of the integral structure 10 is located in a slot 22 in a rotary member 18. The integral structure 10 is then heated to temperature of 800° C. and a load is applied to the end of the integral structure 10 by the dies 14, 16 in order to form a camber on the end of the integral structure 10 gripped by the dies 14, 16. After a camber has been formed at one end of the integral structure 10, the opposite end of the integral structure 10 is rotated by the rotary member 18 so as to twist the integral structure 10 into substantially the desired shape for the dies used during the superplastic forming process.

In some circumstances it may be necessary to hot creep form the twisted integral structure using the dies of a hot creep forming press to adjust the shape of the twisted integral structure to the desired shape for the dies used during the superplastic forming process. It is to be noted that the dies of the hot creep forming press are arranged to contact the integral structure in regions which will not form a part of the resulting blade and which will subsequently be removed. Alternatively the twisted integral structure may be hot creep formed using the dies used during the superplastic forming process. During the hot creep forming process the integral structure is heated to a temperature of 740° C.

The pipe 72 is removed and a second pipe is fitted to the integral structure, and argon is introduced into the areas, within the integral structure, containing the stop off in order to break the adhesive grip which the diffusion bonding pressure has brought about. The argon is carefully introduced to those areas which contain the stop off, and the argon seeps through the stop off and eventually reaches the opposing end of the integral structure. The argon may initially be caused to travel between one pair of workpieces and on reaching the opposite end return to the inlet end between another pair of workpieces. In any event, the argon must travel the whole length of the interior of the integral structure such as to break the adhesive grip between the stop off and the sheets brought about during the diffusion bonding step.

This step is carried out at room temperature because the metal is elastic at room temperature and the minimal extension which occurs does not go beyond the elastic limit. Consequently, the integral structure regains its shape when pressure is removed at the end of the step. If this step is attempted whilst the structure is at the common diffusion bonding and superplastic forming temperature, there is a serious risk of progressive plastic deformation lengthwise of the integral structure, rather than simultaneous deformation over the whole structure. In such circumstances, rupturing of the integral structure frequently occurs.

It is very important that the integral structure 10 is twisted before the argon is introduced into the integral structure 10, to break the adhesive grip brought about by the diffusion bonding pressure, in the areas containing the stop off. Twisting the integral structure 10 at this stage does not impair the structural integrity of the resulting finished article. Whereas twisting the integral structure 10 after the adhesive grip, brought about by diffusion bonding pressure, has been broken may result in impaired structural integrity of the resulting finished article.

The second pipe is then connected to a vacuum pump which is used to evacuate the interior of the sealed assembly and then inert gas, for example argon, is supplied to the interior of the integral structure. This process of evacuating and supplying inert gas to the interior of the integral structure may be repeated several times in order to ensure that most, or substantially all, traces of oxygen are removed from the interior of the integral structure. The particular number of times that the interior of the integral structure is evacuated and purged with inert gas depends upon the size of the workpieces and upon the required integrity of the finished component. The inert gas is supplied to pressurise the interior of the integral structure to atmospheric pressure.

The integral structure is placed between appropriately shaped split dies positioned within an autoclave. The integral structure is again heated to a temperature greater than 850° C. preferably between 900° C. and 950° C. In this example, the dies and integral structure and heated to 925° C. Argon is introduced into the interior of the integral structure between the adjacent sheets, so as to force the outer sheets 42, 46 into the respective die half shapes which generates an internal structure depending on the pattern of the applied stop off.

The magnitude of the movement of at least one of the sheets during deformation, is such as to require superplastic extension to occur. The term "superplastic" is a standard term in the metal forming art and will not be described herein.

Figure 6:
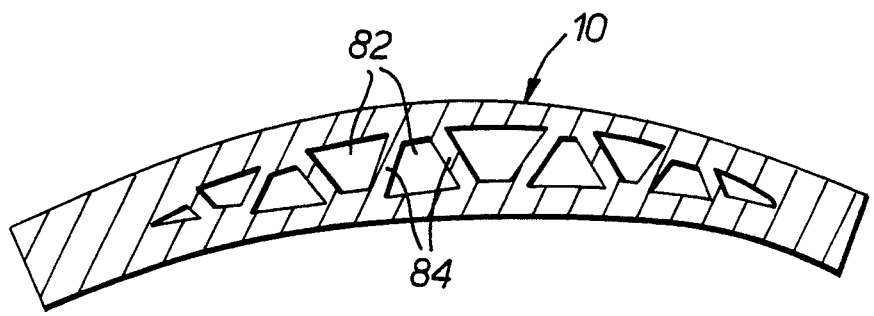
FIG. 6 is a cross-section through the integral structure after the diffusion bonding, twisting and superplastic forming steps of the present invention have been performed.

The introduction of argon into the interior of the integral structure 10 between the sheets forms one or more cavities 82, or chambers, within the integral structure 80 at the preselected areas of the sheets where stop off is applied, as seen in FIG. 6. The sheet 44 is expanded superplastically by the pressure of the argon to generate the internal structure, indicated by web members 84, depending upon the pattern of the applied stop off material.

In order to achieve superplastic forming without rupturing the thinning metal the argon is introduced in a series of pulses, at a pre-calculated rate which will achieve a desired strain rate, as is taught at pp 615–623 in the book "The Science, Technology and Application of Titanium" edited by R. I. Jaffe and N. E. Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the pulses of the gas pulses may thus vary during the expansion of the sheets.

On completion of superplastic forming, the inert argon atmosphere within the integral structure is maintained whilst the structure is cooled. This integral structure may be the finished article, or some final machining of the integral structure may be required to produce the finished article.

In an alternative method, the stack 40 is prepared in the same manner as described previously. The stack 40 is then placed in a vacuum chamber. The vacuum chamber is evacuated to evacuate the interior of the stack and then inert gas, for example argon, is supplied to the vacuum chamber to purge the interior of the stack. This process of evacuating and supplying inert gas to the interior of the stack may be repeated several times in order to ensure that most, or substantially all, traces of oxygen are removed from the interior of the stack. The particular number of times that the interior of the stack is evacuated and purged with inert gas depends upon the size of the workpieces and upon the required integrity of the finished component. The inert gas is supplied to pressurise the interior of the vacuum chamber and stack to atmospheric pressure.

The vacuum chamber and the interior of the stack are then evacuated. The stack is heated to a temperature between 250° C. and 350° C. to evaporate the binder from the stop off. During the baking out of the binder, the vacuum chamber is continuously evacuated to remove the binder from between the sheets and from the vacuum chamber. After the binder has been removed, the edges of the titanium sheets are welded together, for example by an electron beam, to provide a sealed assembly.

The sealed assembly is then transferred to an autoclave and the temperature in the autoclave is increased such that the sealed assembly is heated to a temperature greater than 850° C. and the argon pressure in the autoclave is raised to greater than 294 pounds per square inch ($20.26 \times 10^5 Nm^{-2}$) and held at that temperature and pressure for a predetermined time. Preferably the sealed assembly is heated to between 900° C. and 950° C. and the pressure is between 294 pounds per square inch ($20.26 \times 10^5 Nm^{-2}$) and 441 pounds per square inch ($30.39 \times 10^5 Nm^{-2}$). The pressure is then reduced to ambient, diffusion bonding having been achieved and the sealed assembly, which is then an integral structure is removed.

Alternatively after the binder has been removed the titanium sheets may be diffusion bonded together without the need to weld the edges of the titanium sheets.

Following diffusion bonding the integral structure is processed in the same manner as described previously.

Although the description has referred to titanium sheets or titanium workpieces the present invention is equally applicable to workpieces of other elementary metals, metal alloys and metal matrix composites which are diffusion bondable and one of the workpieces must be capable of superplastic extension. Aluminium and stainless steel are capable of superplastic extension at suitable temperatures and pressures.

The method is suitable for manufacturing fan blades fan duct outlet guide vanes etc. for gas turbine engines.

Although the description has referred to a stack of three metal sheets it is possible to use stacks comprising two metal sheets or stacks comprising four or more metal sheets depending upon the particular article to be manufactured.

We claim:

1. A method of manufacturing an article by superplastic forming and diffusion bonding at least two metal workpieces, each of the metal workpieces having at least one flat surface, the method comprising the steps of
    (a) applying a stop off material to prevent diffusion bonding to preselected areas of one of the flat surfaces of at least one of the at least two metal workpieces,
    (b) assembling the at least two workpieces into a stack relative to each other so that the flat surfaces are in mating abutment,
    (c) applying heat and pressure across the thickness of the at least two workpieces to diffusion bond the at least two workpieces together in areas other than the preselected areas to form an integral structure, (d) heating the integral structure and applying loads to opposite ends of the integral structure to twist one end relative to the other end to contour the integral structure to a predetermined shape, (e) while maintaining the at least one workpiece at a temperature at which the metal is elastic, internally pressurising the twisted integral structure to break the adhesive bond between the stop off material and the at least one workpiece in the preselected areas, (f) heating the twisted integral structure and internally pressurising it to cause the preselected areas of at least one of the workpieces to be superplastically formed to produce an article of predetermined shape.

2. A method as claimed in claim 1 including after internally pressurising the twisted integral structure to break the adhesive bond and before internally pressurising the integral structure to superplastically form at least one workpiece, sequentially evacuating and supplying inert gas to the interior of the twisted integral structure to remove oxygen from the interior of the twisted integral structure.

3. A method as claimed in claim 2 in which the step of sequentially evacuating and supplying inert gas to the interior of the twisted integral structure to remove oxygen is performed a plurality of times.

4. A method of manufacturing an article by superplastic forming and diffusion bonding at least two metal workpieces, each of the metal workpieces having at least one flat surface, the method comprising the steps of (a) applying a stop off material to prevent diffusion bonding to preselected areas of at least one of the flat surfaces of at least one of the at least two metal workpieces, (b) assembling the at least two workpieces into a stack relative to each other so that the flat surfaces are in mating abutment, (c) sealing the edges of the at least two workpieces together, except where a pipe is to be inserted, and joining a pipe to the stack to provide a sealed assembly, (d) sequentially evacuating the interior of the sealed assembly and supplying inert gas to the interior of the sealed assembly through the pipe to remove oxygen from the interior of the sealed assembly, (e) placing the sealed assembly in an oven while continuously evacuating the sealed assembly, (f) heating the sealed assembly while it is within the oven to evaporate volatile binder from the stop off material while continuously evacuating the sealed assembly to remove the volatile binder from between the at least two metal workpieces of the sealed assembly, (g) sealing the pipe, (h) applying heat and pressure across the thickness of the at least two workpieces to diffusion bond the at least two workpieces together in areas other than the preselected areas to form an integral structure, (i) heating the integral structure and applying loads to opposite ends of the integral structure to twist one end relative to the other end to contour the integral structure to a predetermined shape, (j) while maintaining the at least one workpiece at a temperature at which the metal is elastic, internally pressurising the twisted integral structure to break the adhesive bond between the stop off material and the at least one workpiece in the preselected areas, (k) heating the twisted integral structure and internally pressurising it to cause the preselected areas of a least one of the workpieces to be superplastically formed to produce an article of predetermined shape.

5. A method as claimed in claim 4 wherein before the pipe is sealed, the sealed assembly is cooled whilst the sealed assembly is continuously evacuated.

6. A method as claimed in claim 5 in which the sealed assembly is cooled to ambient temperature.

7. A method as claimed in claim 4 including after internally pressurising the integral structure to break the adhesive bond and before internally pressurising the integral structure to superplastically form at least one workpiece, sequentially evacuating and supplying inert gas to the interior of the integral structure to remove oxygen from the interior of the integral structure.

8. A method as claimed in claim 7 in which the step of sequentially evacuating and supplying inert gas to the interior of the integral structure to remove oxygen is performed a plurality of times.

9. A method as claimed in claim 4 comprising welding the edges of the workpieces together.

10. A method as claimed in claim 4 including heating the stack to a temperature between 250° C. and 350° C. to evaporate the volatile binder from the stop off material.

11. A method as claimed in claim 1 or claim 4 wherein, where the workpieces are made of a titanium alloy, heating the workpieces to a temperature equal to or greater than 850° C. and applying a pressure equal to or greater than $20 \times 10^5$ Nm$^{-2}$ to diffusion bond the workpieces together to form an integral structure.

12. A method as claimed in claim 11 wherein the workpieces are heated to a temperature between 900° C. and 950° C. and the pressure applied is between $20 \times 10^5$ Nm$^{-2}$ and $30 \times 10^5$ Nm$^{-2}$.

13. A method as claimed in claim 11 wherein the integral structure is heated to a temperature equal to or greater than 850° C. to superplastically form the integral structure.

14. A method as claimed in claim 13 wherein the integral structure is heated to a temperature between 900° C. and 950° C.

15. A method as claimed in claim 4 in which the step of sequentially evacuating the interior of the sealed assembly and supplying inert gas to the interior of the sealed assembly through the pipe to remove oxygen from the interior of the sealed assembly is performed a plurality of times.

16. A method as claimed in claim 1 or claim 4 in which the integral structure is heated to a temperature of 800° C. for twisting the opposite ends of the integral structure.

17. A method as claimed in claim 1 or claim 4 including before the opposite ends of the integral structure are twisted, heating and applying a load to one end of the integral structure to camber said end.

18. A method as claimed in claim 1 or claim 4 including holding a first one of the opposite ends stationary and rotating the other one of the opposite ends to twist the integral structure.

19. A method as claimed in claim 1 or claim 4 in which the article is a fan blade.

20. A method as claimed in claim 1 or 4 in which the temperature is room temperature.

* * * * *